(12) United States Patent
Park et al.

(10) Patent No.: US 8,204,556 B2
(45) Date of Patent: Jun. 19, 2012

(54) HINGE DEVICE FOR PORTABLE TERMINAL

(75) Inventors: Jung-Bae Park, Daegu (KR);
Myoung-Hoon Park, Goyang-si (KR);
Yong-Woo Jeon, Gumi-si (KR); Soo-Ik Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 603 days.

(21) Appl. No.: 11/650,484

(22) Filed: Jan. 8, 2007

(65) Prior Publication Data
US 2007/0240879 A1   Oct. 18, 2007

(30) Foreign Application Priority Data

Apr. 17, 2006  (KR) .......................... 10-2006-034512
Aug. 22, 2006  (KR) .......................... 10-2006-079314

(51) Int. Cl.
*H04M 1/00* (2006.01)
(52) U.S. Cl. ................ 455/575.1; 455/575.3; 455/575.4
(58) Field of Classification Search .... 455/575.1–575.9, 455/456.5–456.6, 550.1, 554.2, 344–350, 455/556.1, 556.2, 557, 422.1, 552.1, 553.1, 455/90.3; 361/679.27, 679.28, 679.33, 600, 361/625, 679.01–679.09, 679.1, 679.11–679.19, 361/679.2, 679.21–679.29, 679.3, 679.31–679.39, 361/679.4, 679.41–679.44; 345/158, 169
See application file for complete search history.

(56) References Cited

U.S. PATENT DOCUMENTS

| | | | | |
|---|---|---|---|---|
| 6,549,789 B1 * | 4/2003 | Kfoury | ...................... | 455/550.1 |
| 6,728,557 B1 * | 4/2004 | Tracy et al. | ................ | 455/575.3 |
| 7,187,957 B2 * | 3/2007 | Kato | .......................... | 455/575.3 |
| 7,440,783 B2 | 10/2008 | Hyun | | |
| 7,450,172 B2 | 11/2008 | Lee et al. | | |
| 2001/0044320 A1 * | 11/2001 | Ono et al. | ..................... | 455/550 |
| 2003/0040288 A1 * | 2/2003 | Kang et al. | ..................... | 455/90 |
| 2004/0179330 A1 * | 9/2004 | Lee et al. | ..................... | 361/679 |
| 2005/0198779 A1 * | 9/2005 | Jung et al. | ...................... | 16/367 |
| 2006/0135227 A1 * | 6/2006 | Chang et al. | ............... | 455/575.3 |

FOREIGN PATENT DOCUMENTS

| | | |
|---|---|---|
| CN | 1531363 | 9/2004 |
| EP | 1 549 029 | 6/2005 |
| GB | 2 409 598 | 6/2005 |
| JP | 2002-44201 | 2/2002 |
| JP | 2005-308112 | 11/2005 |
| KR | 1020040080213 | 9/2004 |
| KR | 10-0463777 | 12/2004 |

(Continued)

*Primary Examiner* — Kent Chang
*Assistant Examiner* — San Htun
(74) *Attorney, Agent, or Firm* — Roylance, Abrams, Berdo & Goodman, L.L.P.

(57) ABSTRACT

A hinge device for a portable terminal that includes a first housing and a second housing is provided. The first and second housings are connected by a hinge device at one end of the first housing, and they rotate so that the front and back faces may be reversed. The hinge device includes a first hinge base combined with one side of an end portion of the first housing, a second hinge base combined with one side of an end portion of the second housing and rotating in opposition to the first hinge base, and an elastic member providing an elastic force in a direction that the first hinge base and the second hinge base are adhered closely to each other. The hinge device facilitates a user's viewing of video, such as DMB video, and contributes to the diversification of the design of the portable terminal.

26 Claims, 13 Drawing Sheets

FOREIGN PATENT DOCUMENTS

| | | |
|---|---|---|
| KR | 1020050015860 | 2/2005 |
| KR | 1020050056603 | 6/2005 |
| KR | 1020050071015 | 7/2005 |
| KR | 10-2006-0045920 | 5/2006 |
| WO | WO 98/48548 | 10/1998 |
| WO | WO 2004/079935 | 9/2004 |
| WO | 2005067268 | 7/2005 |
| WO | WO 2006/022383 | 3/2006 |

\* cited by examiner

HINGE DEVICE FOR PORTABLE TERMINAL

PRIORITY

This application claims priority under 35 U.S.C. §119 to an application entitled "Hinge Device for Portable Terminal" filed in the Korean Intellectual Property Office on Apr. 17, 2006 and assigned Ser. No. 2006-34512 and an application entitled "Hinge Device for Portable Terminal" filed in the Korean Intellectual Property Office on Aug. 22, 2006 and assigned Ser. No. 2006-79314, the entire contents of both of which are hereby incorporated by reference.

BACKGROUND OF THE INVENTION

1. Field of the Invention

The present invention generally relates to a portable terminal. More particularly, the present invention relates to a hinge device for a portable terminal.

2. Description of the Related Art

Generally, portable terminals can be classified as bar-type terminals, flip-type terminals, folder-type terminals, and sliding-type terminals according to their appearance.

A bar-type terminal has a single housing having a data input/output means, a transmitting unit (or mouthpiece), and a receiving unit (or earpiece). Since the data input means (such as a keypad) is exposed at all times, the bar-type terminal is susceptible to damage. Moreover, there is a limit as to how small a bar-type terminal can be made because a sufficient distance needs to be maintained between the transmitting unit and the receiving unit.

A flip-type terminal includes a main body, a flip, and a hinge module that connects the main body to the flip. In a flip-type terminal, the data input/output means, the transmitting unit, and the receiving unit are mounted in the main body. Damage to the data input means is minimized by covering the data input means with the flip. Like the bar-type terminal, there is a limit as to how small a flip-type terminal can be made because of the requirement for a sufficient distance between the transmitting unit and the receiving unit.

A folder-type terminal includes a main body, a folder, and a hinge module that rotatably connects the main body with the folder. The folder is opened and closed by rotating the folder. When the folder is closed (i.e. folded against the main body), the phone is placed into a standby mode, and the keypad is covered to prevent damage to the keypad. When the folder is opened to make a call, the transmitting unit and the receiving unit are moved away for each other, and a sufficient distance between the transmitting unit and the receiving unit is secured. This contributes to the ability to make the folder-type portable terminal smaller.

Sliding-type terminals have a pair of housings slidably combined with each other. One of the pair of housings is opened by sliding it with respect to the other housing. In a sliding-type terminal, the keypad is covered to prevent damage to the keypad when the housing is closed. When the housing is open, however, the transmitting unit and the receiving unit are moved away for each other to secure a sufficient distance between the transmitting unit and the receiving unit. The sliding-type terminal is easy to carry and use.

In the portable terminal consumer market, the folder and sliding type terminals have become the most popular type of terminal.

Initially, mobile communication services using portable terminals was limited to voice communication and short message transmission. Now, however, the available services have expanded to include numerous services, such as an entertainment service (such as games, comics, and ring tones), multimedia service (such as moving pictures), on-demand audio service, and on-demand video service. In recent years, broadcasting services such as terrestrial Digital Multimedia Broadcasting (DMB) has become commercially available, and portable terminals have also included the ability to view DMB services.

Conventional portable terminals are still designed primarily for communication, however, and they are inconvenient to use to view broadcasts. This is partially because users typically use the broadcast viewing function for a longer time than they use the communication function. During this viewing, the users must hold and maintain the portable terminal (which is designed for portability and communications) at an appropriate position for viewing broadcasting. This may be awkward and inconvenient for a user.

Accordingly, there is a need for an improved portable terminal that a user may use to conveniently watch video, such as broadcast video, as well as perform communication functions.

SUMMARY OF THE INVENTION

An aspect of the present invention is to address at least the above problems and/or disadvantages and to provide at least the advantages described below. Accordingly, an aspect of the present invention is to provide a hinge device for a portable terminal that is easy to use as a communication apparatus and that facilitates viewing video.

It is another object of the present invention to provide a hinge device for a portable terminal that allows for diverse designs for portable terminals.

According to one aspect of the present invention, a hinge device for a portable terminal including a first housing and a second housing combined with one end of the first housing and rotating in a direction that its front and back faces are reversed is provided. The hinge device connects the first housing and the second housing, and includes a first hinge base combined with one side of an end portion of the first housing, a second hinge base combined with one side of an end portion of the second housing and rotating in opposition to the first hinge base, and an elastic member providing an elastic force in a direction that the first hinge base and the second hinge base are urged toward each other.

According to another aspect of the present invention, a hinge device for a portable terminal including a first housing and a second housing combined with one end of the first housing and rotating in a direction that its front and back faces are reversed is provided. The hinge device connects the first housing and the second housing, and includes a first hinge base combined with one side of an end portion of the first housing, a second hinge base combined with one side of an end portion of the second housing and rotating in opposition to the first hinge base, and a third hinge base combined with one face of the second hinge base and including an elastic member.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
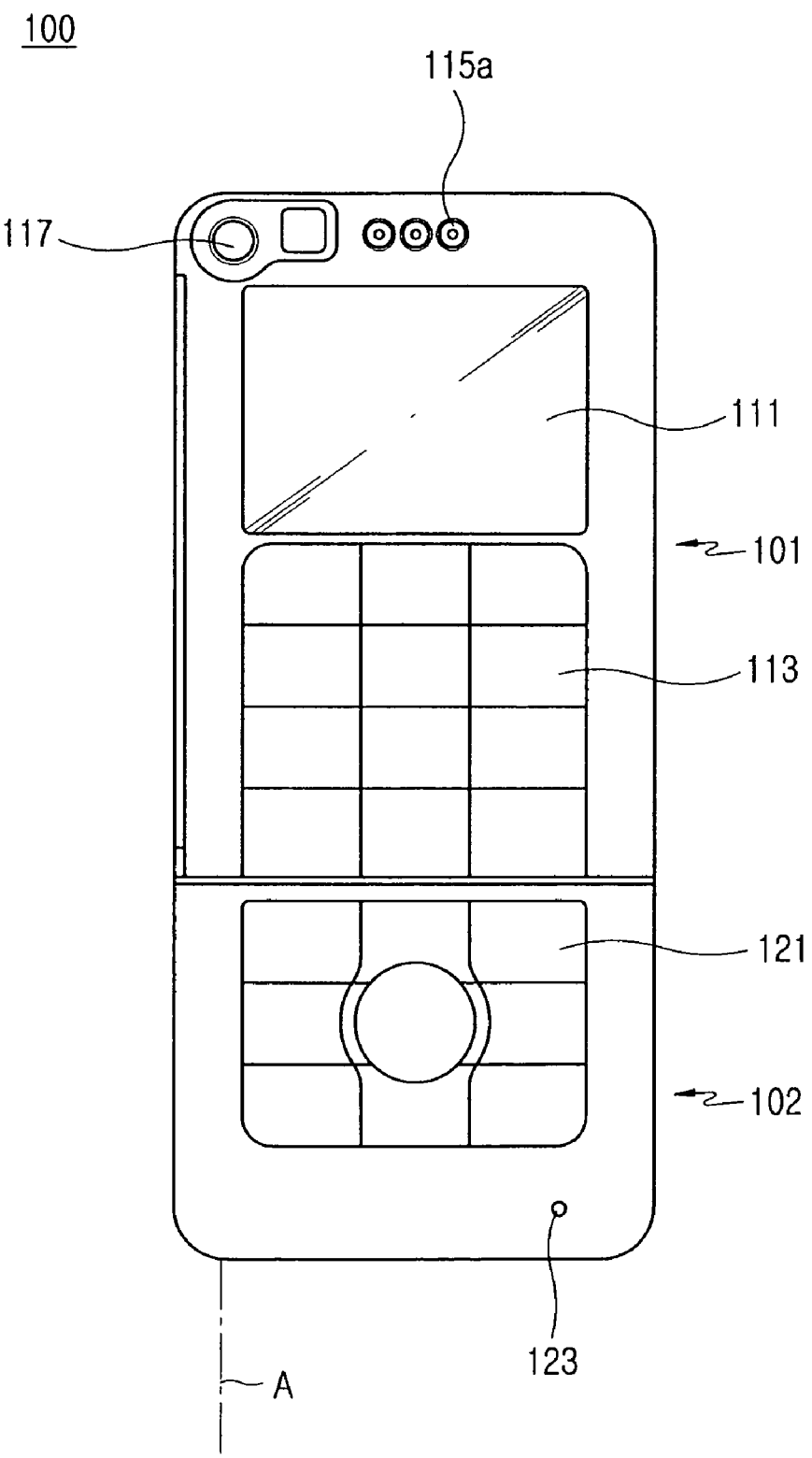
FIG. 1 is a front view of a portable terminal having a hinge device according to a first exemplary embodiment of the present invention.
Figure 2:
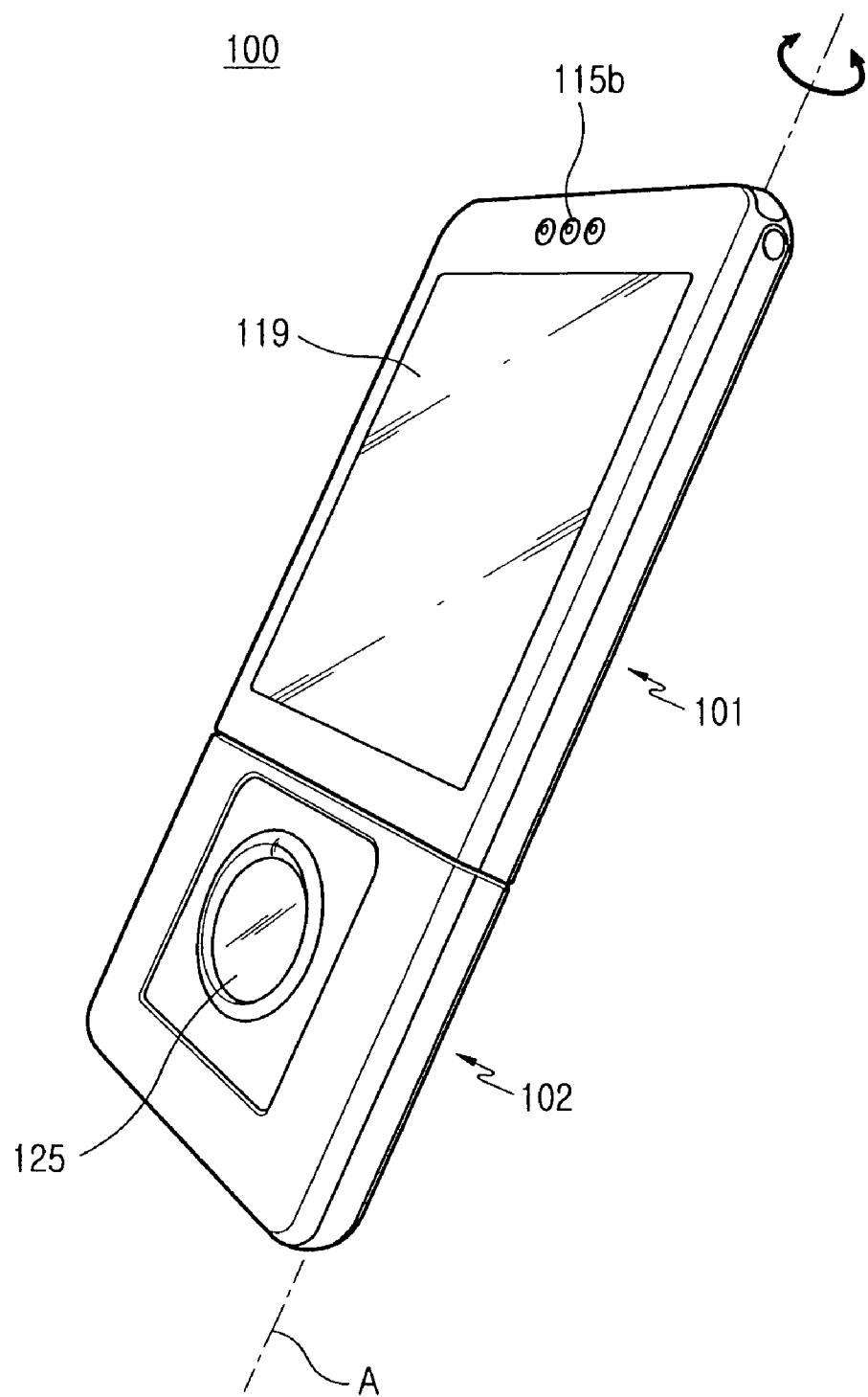
FIG. 2 is a perspective view of the portable terminal shown in FIG. 1.

As shown in FIGS. 1 and 2, a portable terminal 100 having a hinge device (200 of FIG. 5) according to a first exemplary embodiment of the present invention includes a first housing 101 and a second housing 102. The first housing 101 and the second housing 102 rotate with respect to each other along a rotation axis A that is provided at a side of the first housing 101 and extends along the longitudinal direction of the first housing 101. Thus, the second housing 102 rotates so that its front face and back face are reversed with respect to the first housing 101.

As will be described in more detail in connection with the hinge device 200, the rotation range of the second housing 102 may be restricted to prevent the complete reversal of the front and back faces of the second housing 102.

The first housing 101 includes a first display device 111, a first keypad 113, and a receiving unit (or earpiece) 115a in its front face. A camera lens 117 may be installed in a side of an upper portion of the front face of the first housing 101. A speaker device 115b and a second display device 119 are installed in the back face of the first housing 101.

The first display device 111 is installed in the same face as the first keypad 113 to display information input to or output from the portable terminal 100 when a user desires to use a communication function of the portable terminal 100. The second display device 119 provides a larger screen than the first display device 111. Thus, when users desire to view video, such as DMB video, using the portable terminal 100, they may use the second display device 119.

The second housing 102 includes a second keypad 121 and a transmitting unit 123 (or mouthpiece) in its front face and a channel selection key 125 in its back face. The first keypad 111 is used to input numbers and characters and the second keypad 121 is used to call/select a menu and search for information. The channel selection key 125 can include a scroll function using a wheel key and can be used to adjust a channel and a volume in a broadcast viewing mode.

Figure 3:
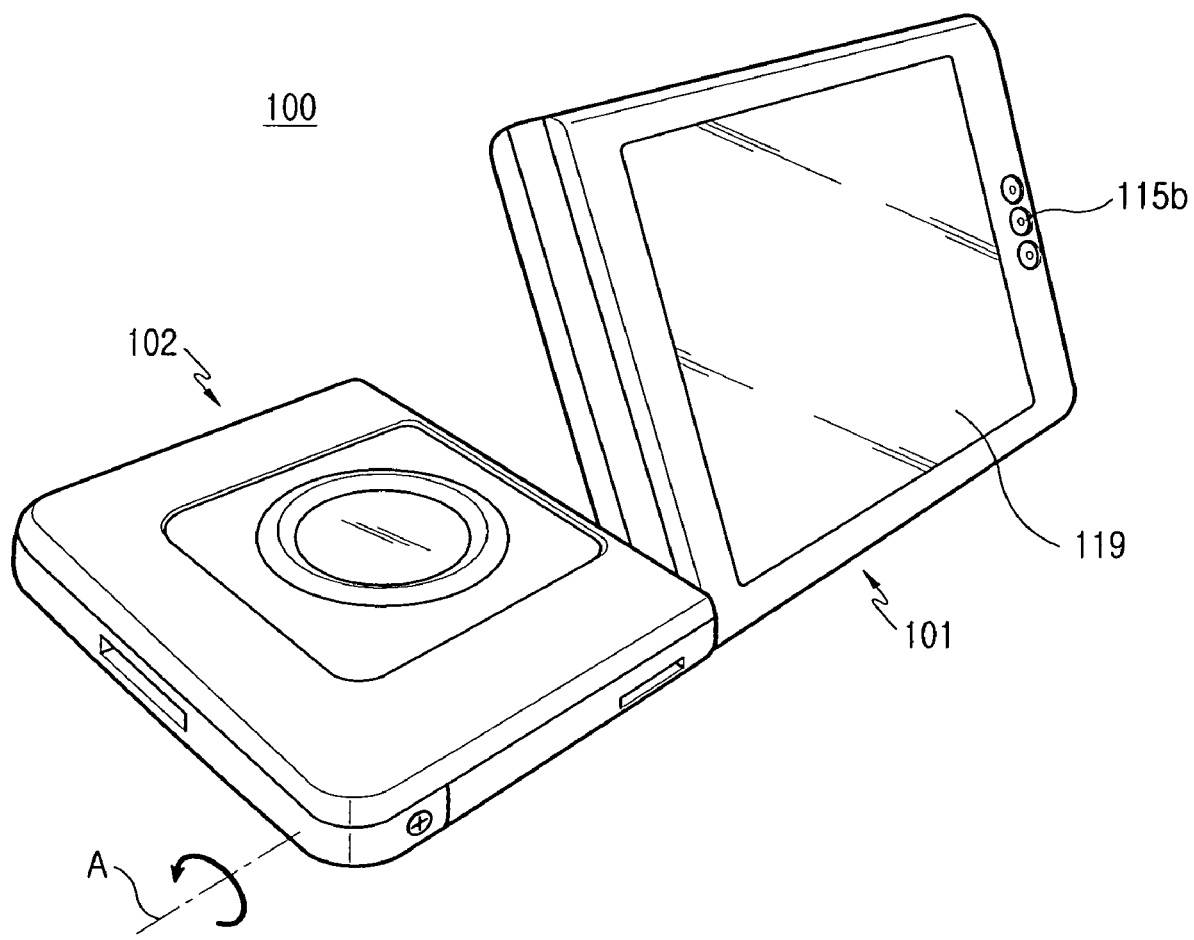
FIG. 3 is a perspective view showing a video viewing mode of the portable terminal shown in FIG. 1.
Figure 4:
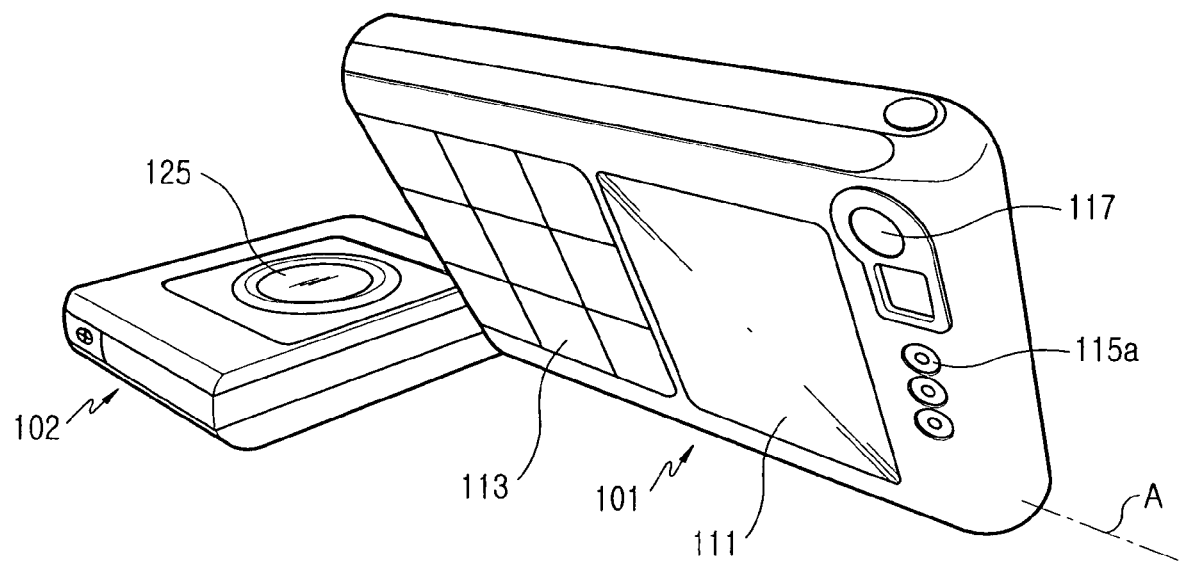
FIG. 4 is another perspective of the portable terminal of FIG. 1, viewed from another direction.

As seen in FIGS. 1 and 2, the first and second housings 101, 102 may be aligned with each other in a first position. Referring to FIGS. 3 and 4, the first and second housings 101, 102 may be rotated about the rotation axis A so that the first and second housings 101, 102 are placed in a second position where they are at an angle with respect to each other. In the second position, if the second housing 102 is placed on a flat surface, the first housing 101, in particular, the second display device 119, is inclined with respect to the flat surface.

Thus, in this second position, the first housing 101 is fixed at an angle with respect to the ground, and a user can comfortably view video, such as DMB video, on the second display device 119. Further, the channel selection key 125 is exposed to the outside so that a user can set a channel to be viewed or adjust a volume by adjusting the channel selection key 125.

Figure 5:
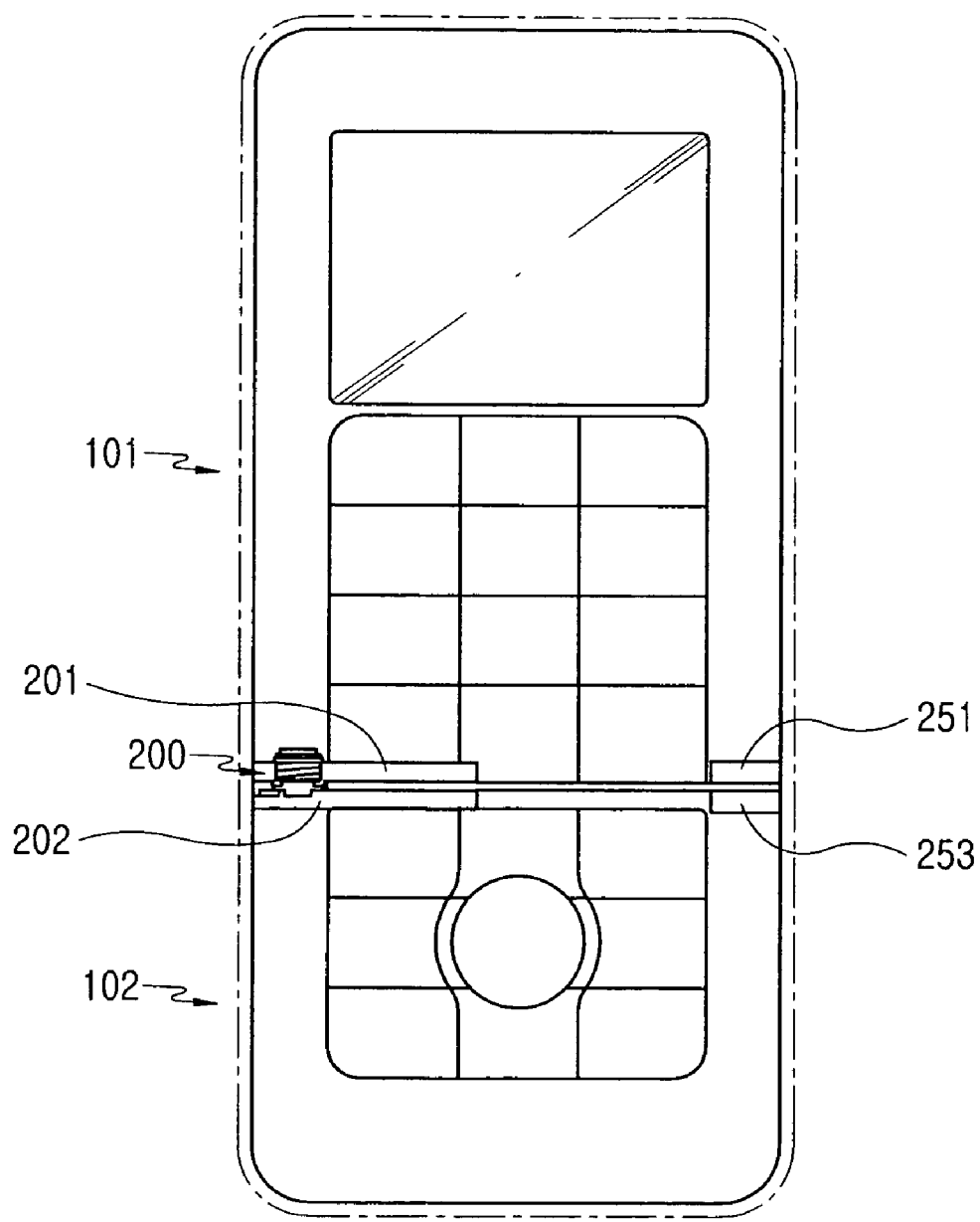
FIG. 5 is a partially cut-away view of the portable terminal shown in FIG. 1 showing the hinge device of the portable terminal.
Figure 6:
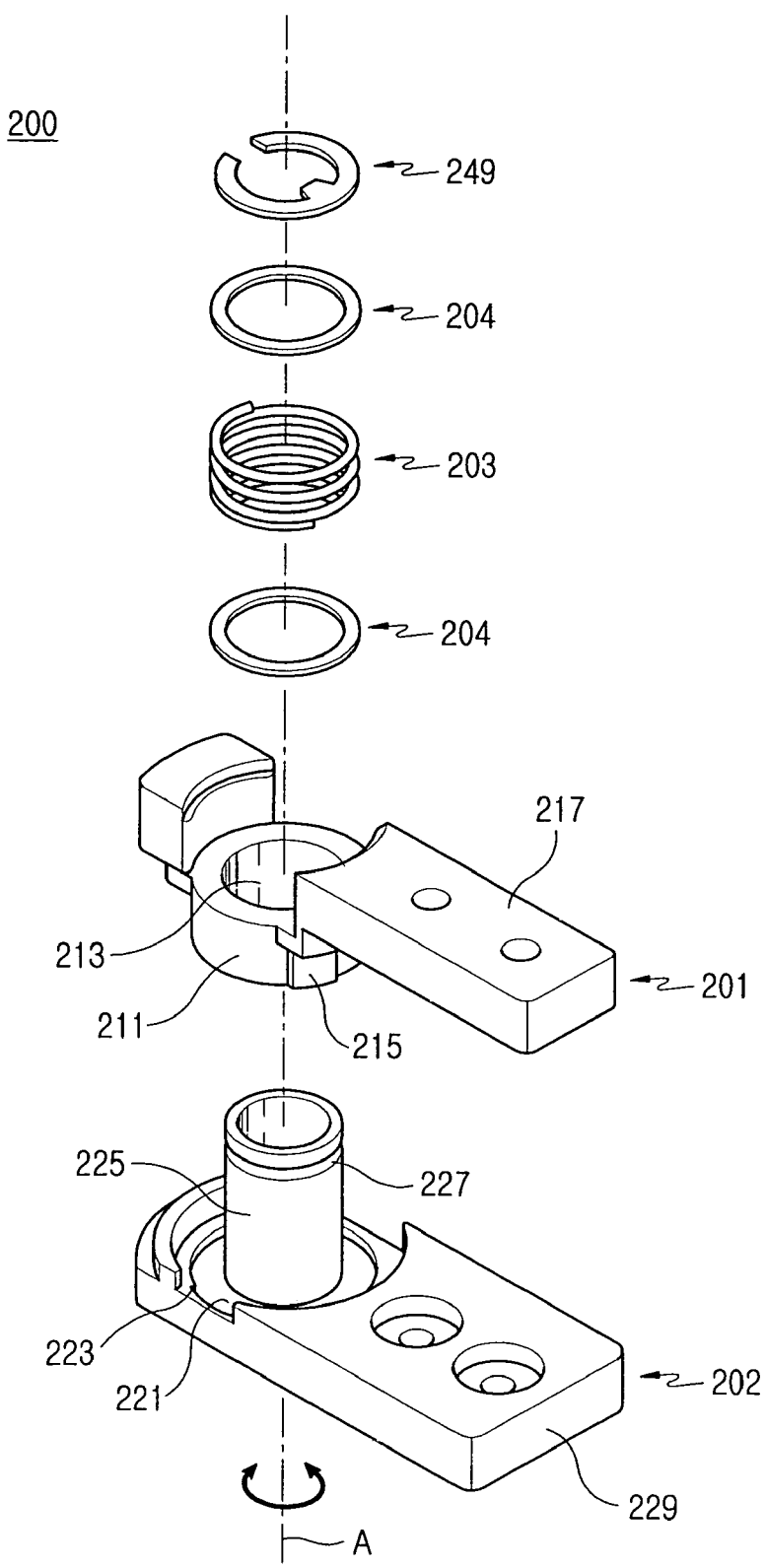
FIG. 6 is an exploded perspective view of the hinge device shown in FIG. 5.
Figure 7:
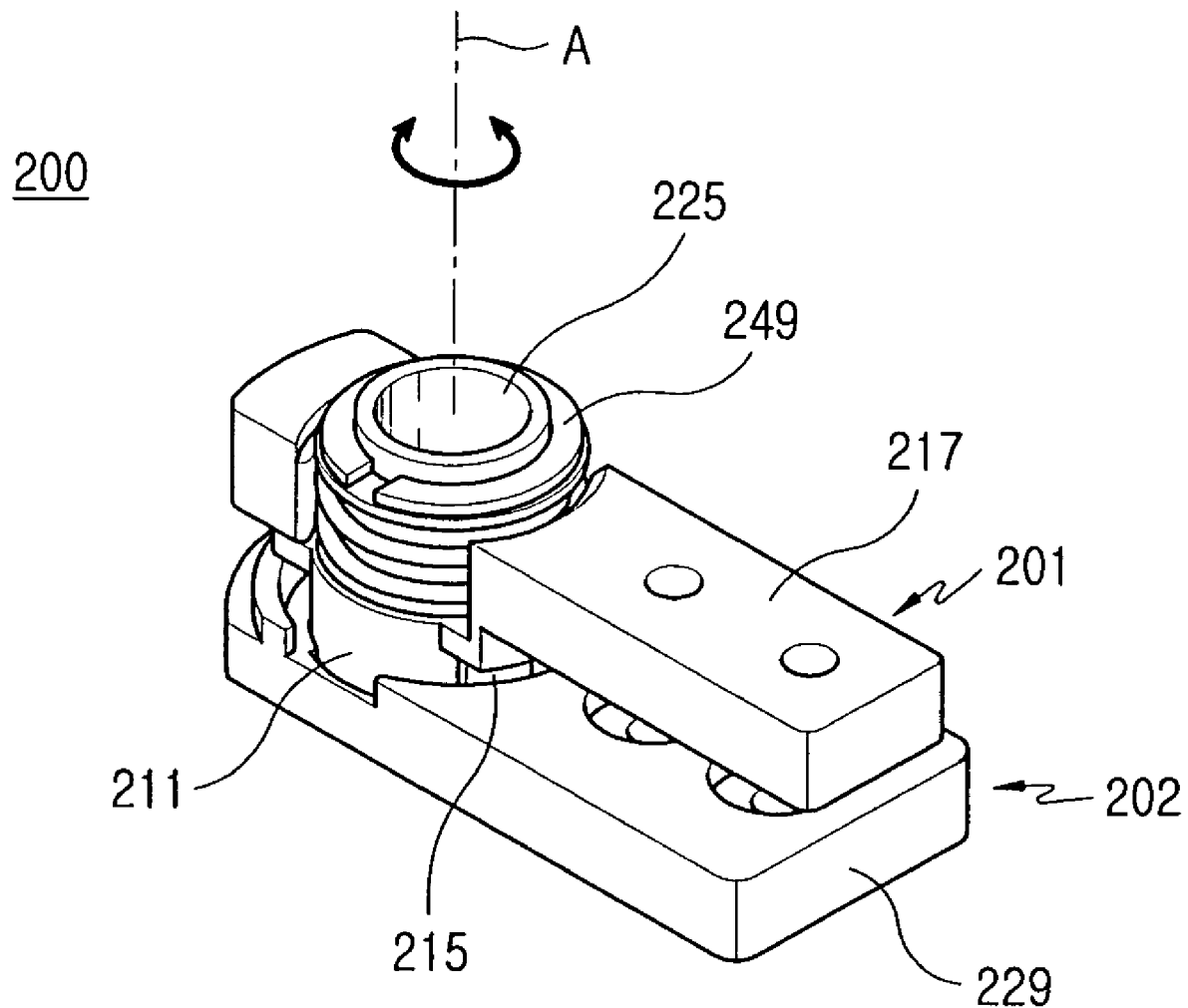
FIG. 7 is an assembled perspective view of the hinge device shown in FIG. 5.

Referring to FIGS. 5 through 7, the hinge device 200 connecting the first housing 101 and the second housing 102 with each other includes a first hinge base 201 and a second hinge base 202 which rotate with respect to each other.

The first hinge base 201 includes a first rotation cylinder 211 that extends from a face of the first hinge base 201 along the rotation axis A and a first engaging part 217 that extends perpendicularly to the rotation axis A. The first rotation cylinder has a first end adjacent the first hinge base and a second end opposite to the first end. A through-hole 213 extends along the rotation axis A through the first rotation cylinder 211. A locking protrusion 215 is formed on the outer circumferential face of the first rotation cylinder 211.

The second hinge device 202 includes a second rotation cylinder 225 that extends from a face of the second hinge device 202 along the rotation axis A and a second engaging part 229 that extends perpendicular to the rotation axis A. The second rotation cylinder has a first end adjacent the second hinge base and a second end opposite to the first end. A rotation groove 221 is formed in a face of the second hinge base 202 to surround the first end of the second rotation cylinder 225. At this time, at least one flange 223 is formed in the inner wall of the rotation groove 221. A circumferential engaging groove 227 is formed on the outer circumferential surface of the second end of the second rotation cylinder 225.

The first hinge base 201 and the second hinge base 202 are combined with each other and rotate with respect to each other along the rotation axis A. The second rotation cylinder 225 penetrates the first rotation cylinder 211 through the through-hole 213 and rotates within the first rotation cylinder 211. At this time, the second end of the first rotation cylinder 211 slidably touches the bottom of the rotation groove 221.

When the first rotation cylinder 211 and the second rotation cylinder 221 rotate with respect to each other, the locking protrusion 215 interferes with the flanges 223. Thus, rotation of the first rotation cylinder 211 and the second rotation cylinder 225 is stopped at a predetermined position. In other words, the rotation range of the first rotation cylinder 211 and the second rotation cylinder 225 with respect to each other is restricted by the locking protrusion 215 and the flanges 223. Thus, the rotation range of the first hinge base 201 with respect to the second hinge base 202 and the rotation range of the first housing 101 with respect to the second housing 102 are restricted.

The second end of the second rotation cylinder 225 protrudes outside the first end of the first rotation cylinder 211. An elastic member 203 is installed on the outer circumferential face of the second rotation cylinder 225. A fastener, such as an E-ring 249 engaged in the engaging groove 227, supports one end of the elastic member 203.

The elastic member 203 is a helical compression spring with a first end and a second end. The first end is supported by the E-ring 249 and the second end is supported by the first hinge base 201. More specifically, the first end of the elastic member 203 is supported along the edge of the through-hole 213. Thus, the elastic member 203 provides an elastic force to urge the first hinge base 201 and the second hinge base 202 towards each other.

To alleviate friction between the elastic member 203 and the E-ring 249 and between the elastic member 203 and the first hinge base 201, washers 204 may be provided at both ends of the elastic member 203. In other words, a washer 204 may be placed between the elastic member 203 and the E-ring 249 and a washer 204 may be placed between the elastic member 203 and the first hinge base 201.

The first hinge base 201 is mounted in the inside of a side of a first end of the first housing 101 and the second hinge base 202 and the second hinge base 202 is installed in the inside of a side of a first end of the second housing 201. The second rotation cylinder 225 protrudes outside the second housing 202 and is combined with the first rotation cylinder 225.

Although not shown in figures, a flexible printed circuit to connect circuit devices installed inside the first housing 101 and the second housing 102 may be provided. To provide a path for the flexible printed circuit, the hinge device 200 may include a wiring hole that extends through the second rotation cylinder 225 along the rotation axis A.

A first magnetic substance 251 is provided in the inside of the opposite side of the first end of the first housing 101 where the first hinge base 201 is mounted, and a second magnetic substance 253 is provided in the inside of the opposite side of the first end of the second housing 102 where the second hinge base 202 is mounted. An attractive force between the first magnetic substance 251 and the second magnetic substance 253 is generated when the first magnetic substance 251 and the second magnetic substance 253 face each other. Thus, when the first housing 101 and the second housing 102 are positioned adjacent to each other (instead of being twisted with respect to each other), the first magnetic substance 251 and the second magnetic substance 253 face each other and generate an attractive force. The attractive force between the first and second magnetic substances 251, 253 keeps the first and second housings 101, 102 positioned parallel with each other.

Referring back to FIGS. 3 and 4, when the first housing 101 and the second housing 102 rotate in a direction that the front face and back face of the second housing 102 are reversed with respect to the first housing 101, the second hinge device 200 generates a frictional force. In other words, a frictional force is generated between the second end of the first rotation cylinder 211 and the rotation groove 221 by the elastic force of the elastic member 203. The generated frictional force suppresses rotation of the first housing 101 and the second housing 102 with respect to each other. The static frictional force is greater than the dynamic frictional force during rotation. Thus, when the second housing 102 is placed on a flat surface and the first housing 101 is inclined with respect to the flat surface, the static frictional force provided by the hinge device 200 suppresses rotation of the first housing 101 and the second housing 102 with respect to each other.

Thus, even when the first housing is inclined, the weight of the portable terminal 100 does not cause the housings to rotate, and a user can comfortably view video by positioning the first housing 101 at an angle.

Figure 8:
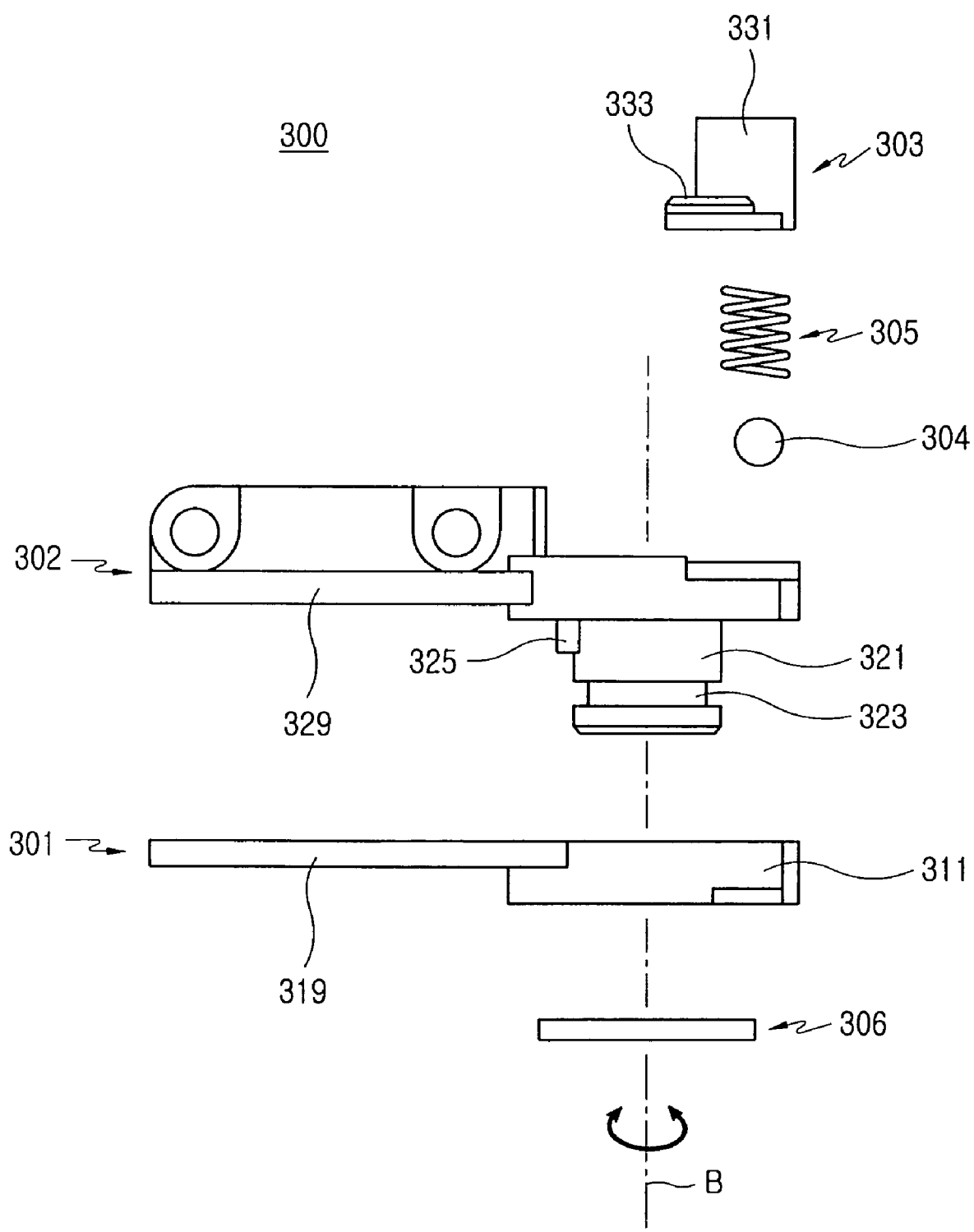
FIG. 8 is an exploded side view of a hinge device for a portable terminal according to a second exemplary embodiment of the present invention.
Figure 9:
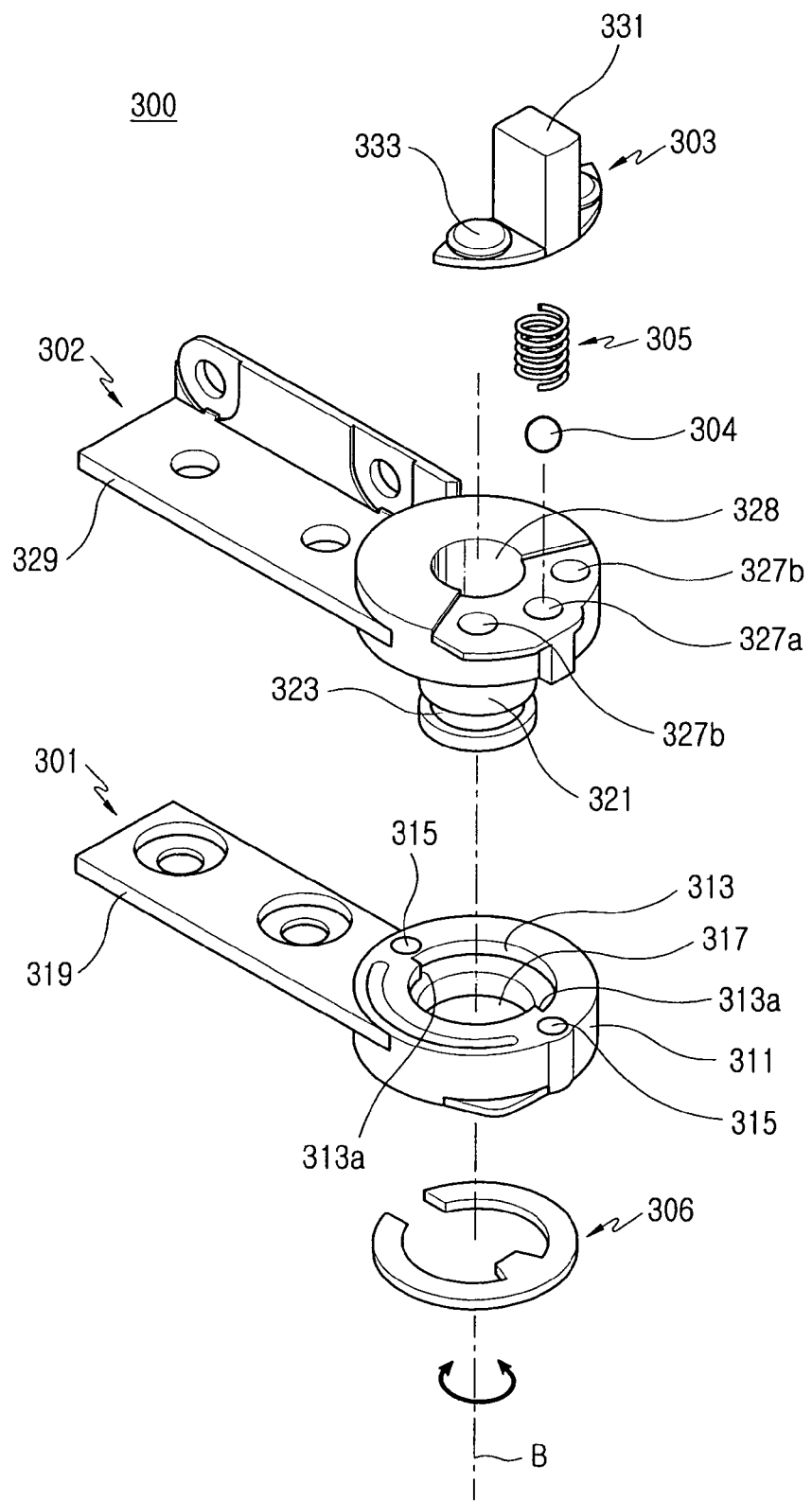
FIG. 9 is an exploded perspective view of the hinge device shown in FIG. 8.
Figure 10:
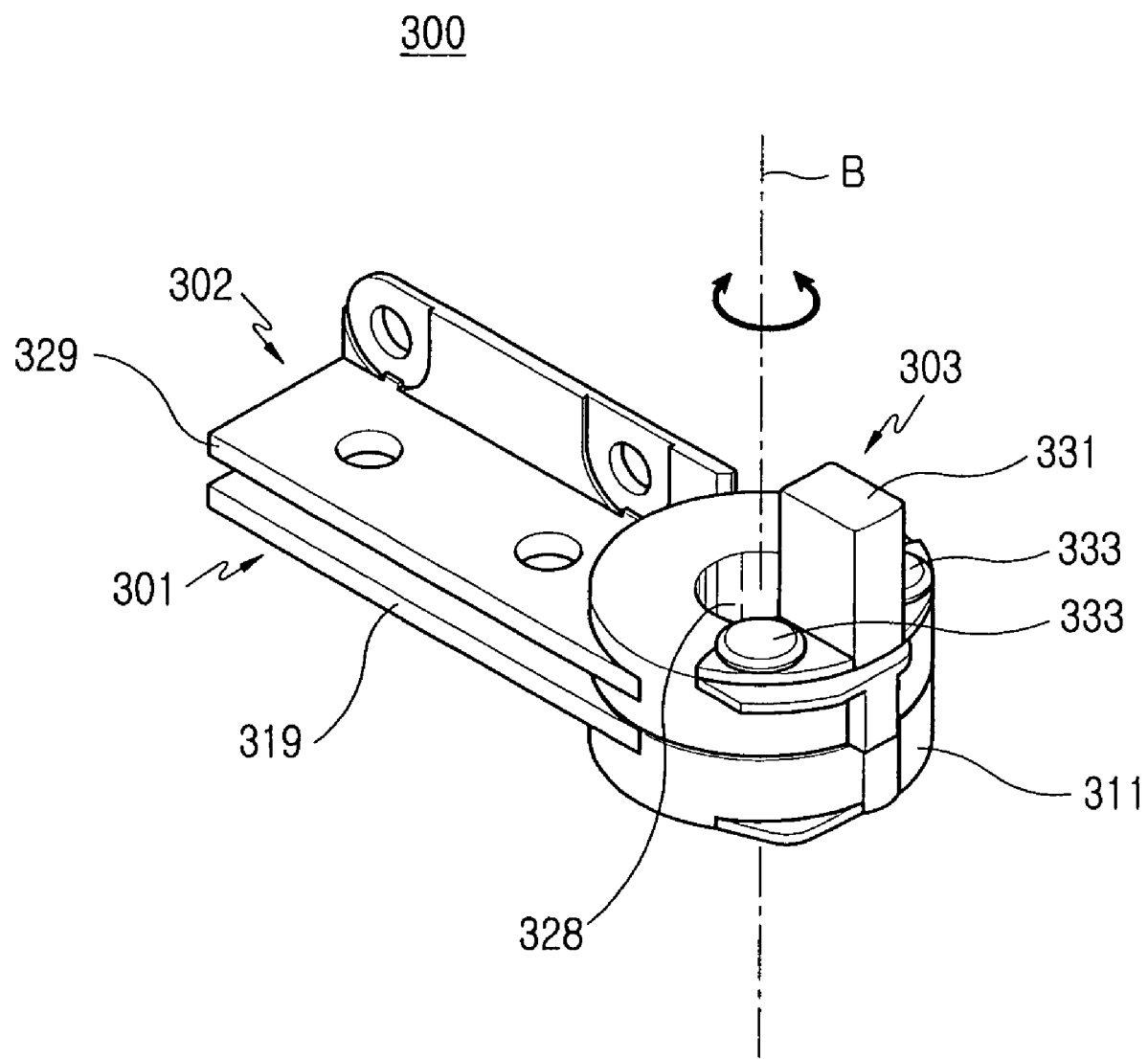
FIG. 10 is an assembled perspective view of the hinge device shown in FIG. 8.

FIG. 8 is an exploded side view illustrating a hinge device 300 according to a second exemplary embodiment of the present invention, FIG. 9 is an exploded perspective view of the hinge device 300 shown in FIG. 8, and FIG. 10 is an assembled perspective view of the hinge device 300 shown in FIG. 8.

The portable terminal using the hinge device 300 is similar to the portable terminal 100 described above in connection with the first exemplary embodiment of the present invention. Thus, a description of the portable terminal will not be repeated.

As shown in FIGS. 8 through 10, the hinge device 300 includes a first hinge base 301, a second hinge base 302, and a third hinge base 303. The first hinge base 301 and the second hinge base 302 rotate with respect to each other. The third hinge base 303 is fixed to a face of the second hinge base 302.

The first hinge base 301 includes a first rotation cylinder 311 that extends from a face of the first hinge base 301 along a rotation axis B and a first engaging part 319 that extends perpendicularly to the rotation axis B. A through-hole 317 extends along the rotation axis B and penetrates the first rotation cylinder 311. A rotation groove 313 that extends along the circumference of the through-hole 317 is formed in a face of the first hinge base 301. At least one flanges 313a are formed in an end portion of the rotation groove 313. A first locking recess 315 is formed adjacent to the through-hole 317 and a second locking recess 315 is formed on the opposite side of the first locking recess 315.

The second hinge base 302 includes a second rotation cylinder 321 that extends from a face of the second hinge base 302 along the rotation axis B and a second engaging part 329 that extends perpendicularly to the rotation axis B. The second rotation cylinder 321 has a first end which is adjacent to the second hinge base 302 and a second end disposed opposite to the first end. A locking protrusion 325 is formed on the outer circumferential face of one end of the second rotation cylinder 321 and a cylinder engaging groove 323 is formed along the outer circumference of the other end of the second rotation cylinder 321. A ball bearing hole 327a for receiving a ball bearing 304 is formed in a face of the second rotation cylinder 321 opposite to the locking recess 315. A pair of engaging holes 327b are formed adjacent to both sides of the ball bearing hole 327a.

The third hinge base 303 includes an elastic member cylinder 331 that extends from a face of the third hinge base 303 along the rotation axis B and cylinder engaging grooves 333 that are disposed adjacent both sides of the elastic member cylinder 331. One end of the elastic member cylinder 331 is open and the other end is closed. An elastic member 305 is disposed in the elastic member cylinder 331. One end of the elastic member 305 is supported by the ball bearing 304 and the other end of the elastic member 305 is supported by the other end of the elastic member cylinder 331.

The first hinge base 301 and the second hinge base 302 are combined with each other and rotate with respect to each other along the rotation axis B. The second rotation cylinder 321 penetrates the first rotation cylinder 311 through the through-hole 317 and rotates within the first rotation cylinder 311. At this time, the locking protrusion 325 of the second rotation cylinder 321 slidably touches the rotation groove 313 of the first rotation cylinder 331.

When the first rotation cylinder 311 and the second rotation cylinder 321 rotate with respect to each other, the locking protrusion 325 engages the flanges 313*a*. Thus, rotation of the first rotation cylinder 311 and the second rotation cylinder 321 is stopped at a predetermined position. In other words, the rotation ranges and the directions of the first rotation cylinder 311 and the second rotation cylinder 321 are restricted by the locking protrusion 325 and the flanges 313*a*. Thus, the rotation ranges and directions of the first hinge base 301 and the second hinge base 302 are also restricted.

The third hinge base 303 receives the elastic member 305 and is combined with the second hinge base 302. When the second hinge base 302 and the third hinge base 303 are combined with each other, the elastic member cylinder 331 faces the ball bearing hole 327*a* and the cylinder engaging grooves 333 face the engaging holes 327*b*. Although not shown in figures, a separate engaging means penetrates the engaging holes 327*b* and is combined with the cylinder engaging grooves 333 to fix the third hinge base 303 to the second hinge base 302. At this time, the elastic member cylinder 331 and the ball bearing hole 327*a* are interconnected, the elastic member 305 is received in the elastic member cylinder 331 and the ball bearing 304 is received in the ball bearing hole 327*a*. One end of the ball bearing 304 is supported by one end of the elastic member 305 and the other end of the ball bearing 304 is supported by a face of the first rotation cylinder 311. In this state, the elastic member 305 produces an elastic force for moving the ball bearing 304 towards the first rotation cylinder 311. If the first rotation cylinder 311 rotates and the ball bearing hole 327*a* faces the locking hole 315, a portion of the ball bearing 304 is pushed out from the ball bearing hole 327*a* by the elastic force of the elastic member 305 and engages the locking recess 315. When the first hinge base 301 and the second hinge base 302 are folded together and the first hinge base 301 rotates approximately 180° from the folded state, the locking recess 315 faces the ball bearing hole 327*a*. Thus, as the ball bearing 304 engages the locking recess 315, the first rotation cylinder 311 maintains a stable position. As the first rotation cylinder 311 rotates, the ball bearing 304 slides along a path from the first locking recess 315 to the second locking recess 315. A separate locking recess may be formed between the first locking recess 315 and the second locking recess 315 to fix the first rotation cylinder 311 at another predetermined angle. Thus, a user can position the first housing 101 at a desired angle when watching a video using the portable terminal.

As the first rotation cylinder 311 and the second rotation cylinder 321 are combined with each other, the second end of the second rotation cylinder 321 protrudes outside the first rotation cylinder 311. The engaging groove 323 of the second rotation cylinder also protrudes outside the first rotation cylinder. An E-ring 306 engages the engaging groove 323 to hold the first and second hinge bases 301, 302 together.

Although not shown in figures, a flexible printed circuit to connect circuit devices installed inside the first housing 101 and the second housing 102 may be provided. To provide a path for the flexible circuit, the hinge device 300 may include a wiring hole 328 that extends through the second rotation cylinder 321 along the rotation axis B.

Figure 11:
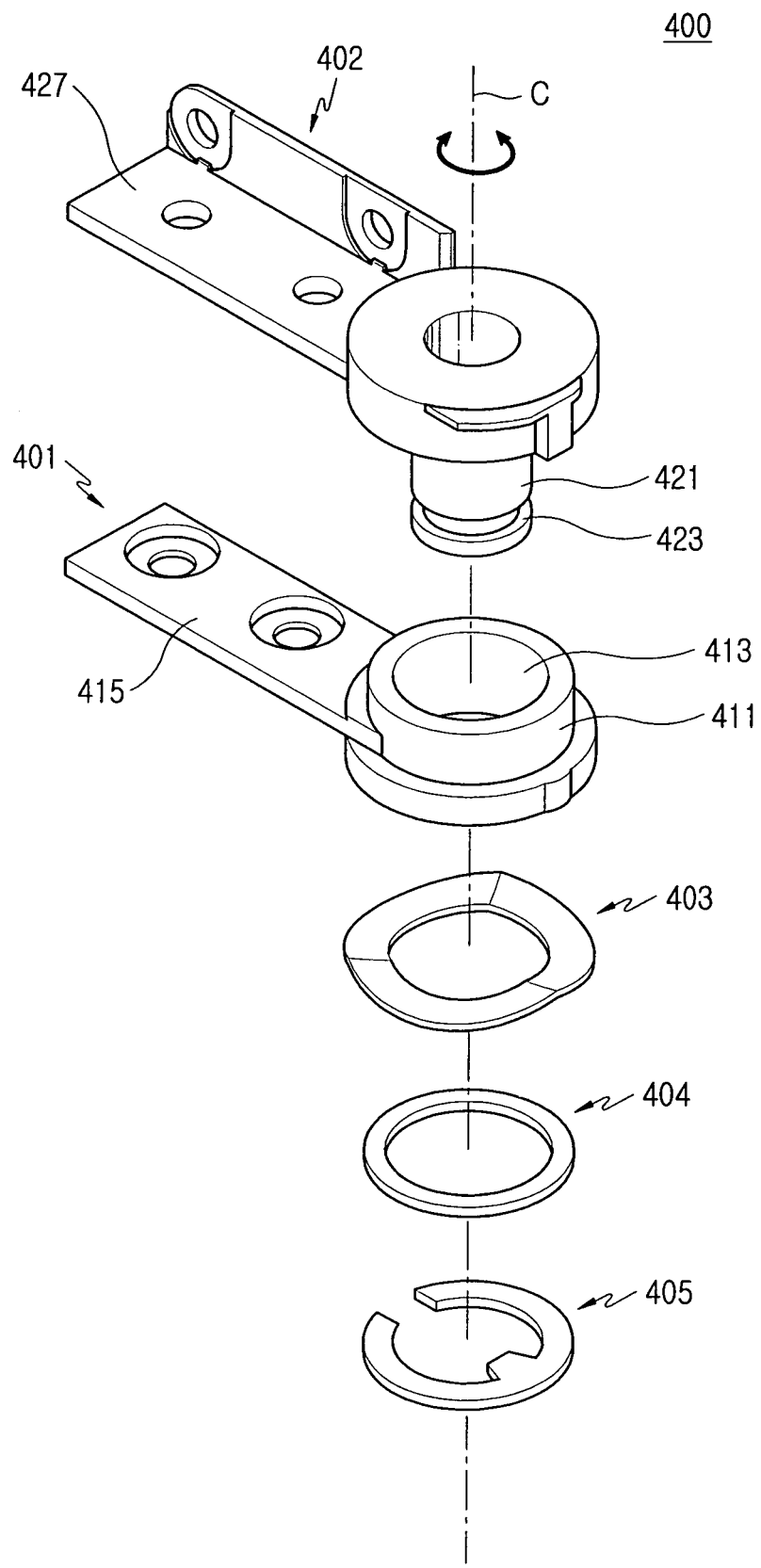
FIG. 11 is an exploded perspective view of a hinge device of a portable terminal according to a third exemplary embodiment of the present invention.
Figure 12:
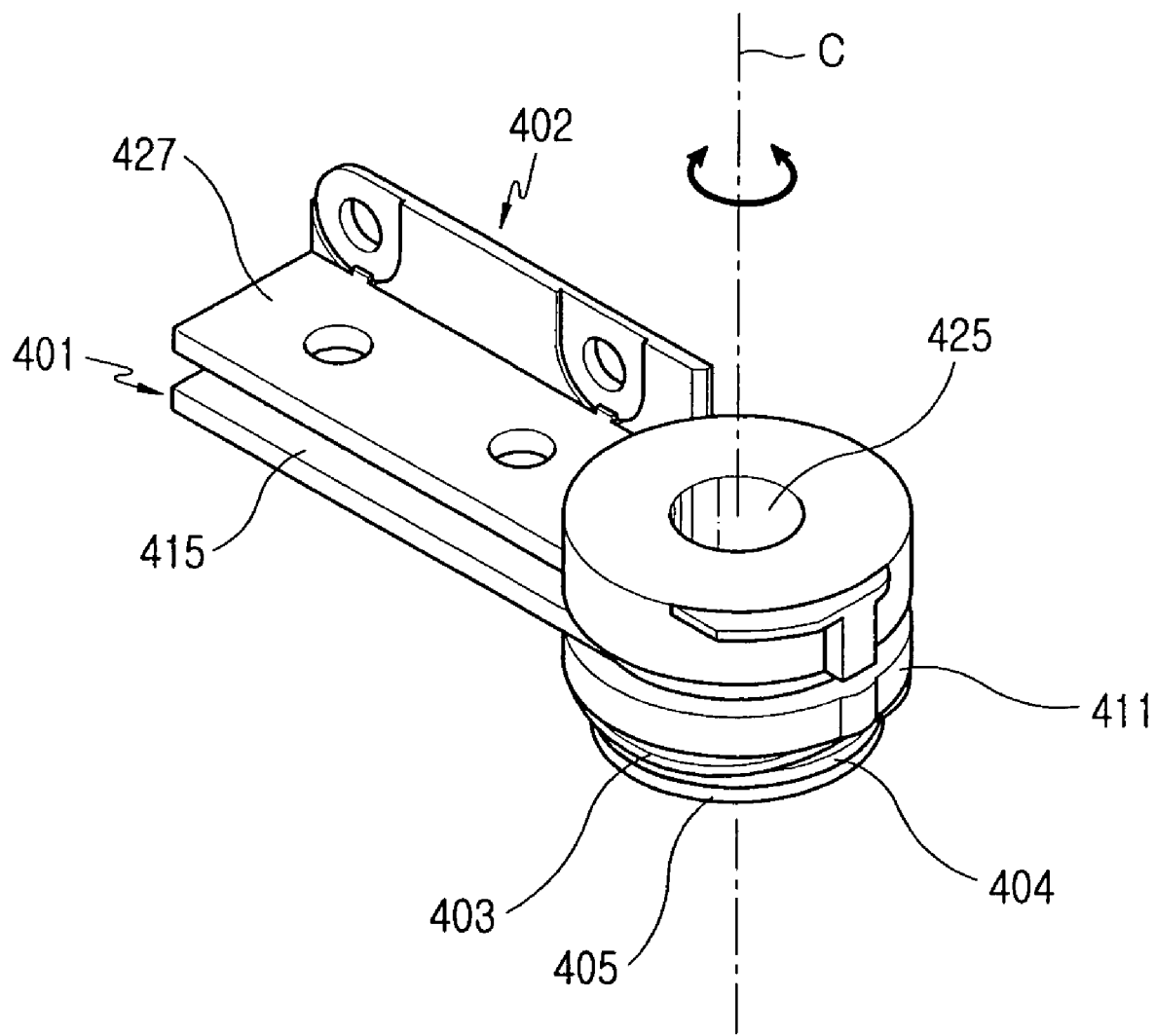
FIG. 12 is an assembled perspective view of the hinge device shown in FIG. 11.
Figure 13:
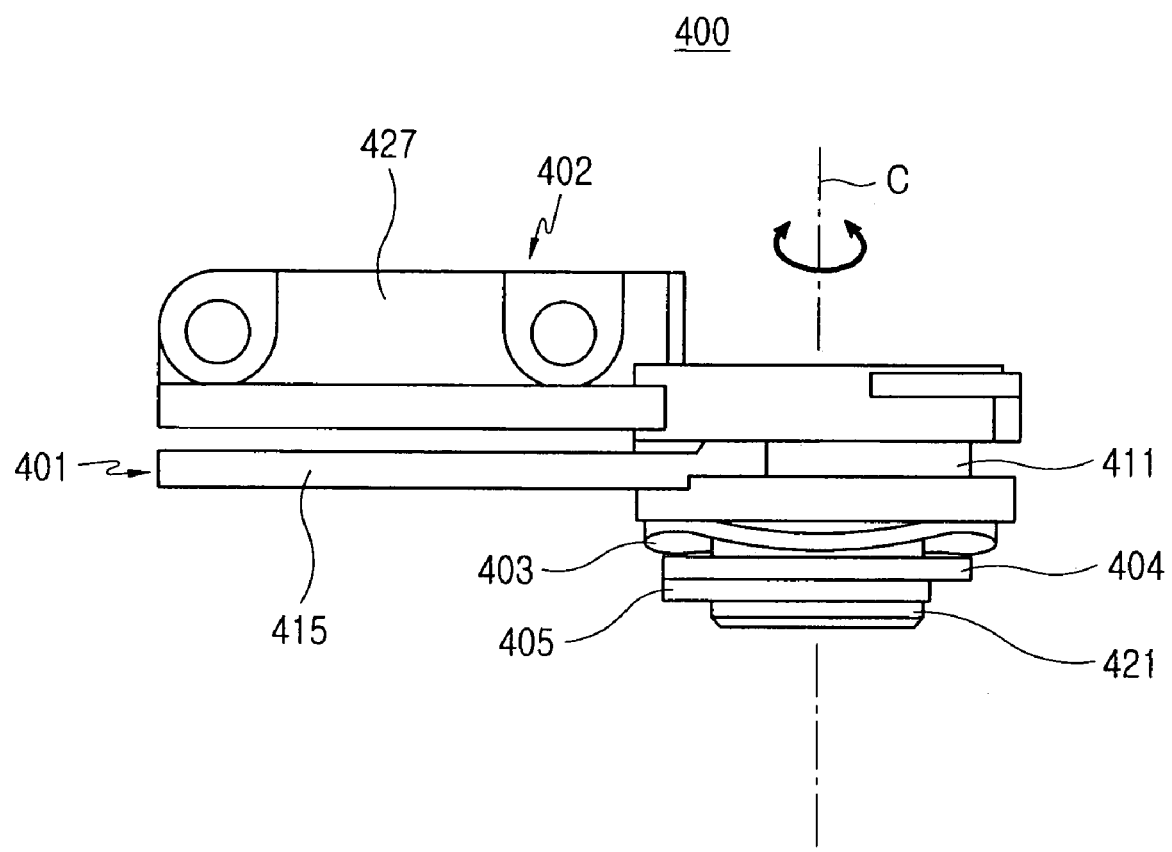
FIG. 13 is a side view of a hinge device shown in FIG. 11.

FIG. 11 is an exploded perspective view of a hinge device 400 according to a third exemplary embodiment of the present invention, FIG. 12 is an assembled perspective view of the hinge device 400 shown in FIG. 11, and FIG. 13 is a side view of the hinge device 400 shown in FIG. 11.

The portable terminal using the hinge device 400 is similar to the portable terminal 100 described above in connection with the first exemplary embodiment of the present invention. Thus, a description of the portable terminal will not be repeated.

As shown in FIGS. 11 through 13, the hinge device 400 includes a first hinge base 401 and a second hinge base 402 that rotate with respect to each other.

The first hinge base 401 includes a first rotation cylinder 411 that extends from a face of the first hinge base 401 along a rotation axis C and a first engaging part 415 that extends perpendicularly to the rotation axis C. A through-hole 413 extends along the rotation axis C through the first rotation cylinder 411.

The second hinge base 402 includes a second rotation cylinder 421 that extends from a face of the second hinge base 402 along the rotation axis C and a second engaging part 427 that extends perpendicularly to the rotation axis C. The second rotation cylinder has a first end adjacent to the second hinge base 402 and a second end disposed opposite to the first end. An engaging groove 423 extends along the circumference of the second end of the second rotation cylinder 421.

The first hinge base 401 and the second hinge base 402 are combined and rotate with respect to each other along the rotation axis C. The second rotation cylinder 421 penetrates the first rotation cylinder 411 through the through-hole 425 and rotates within the first rotation cylinder 411. One end of the first rotation cylinder 411 slides along one face of the second hinge base 402.

The second end of the second rotation cylinder 421 protrudes through the first rotation cylinder 411 and an elastic member 403 and a washer 404 are sequentially included on the outer circumferential face of the second rotation cylinder 421. An E-ring 405 is engaged in the engaging groove 423 and the elastic member 403 and the washer 404 are bound by the outer circumferential face of the second rotation cylinder 421.

A first end of the elastic member 403 is supported by the washer 404 and a second end of the elastic member 403 is supported by the first hinge base 401. More specifically, the second end of the elastic member 403 is supported along the edge of the through-hole 413. Thus, the elastic member 403 is a wave type washer and provides an elastic force that urges the first and second hinge bases 401, 402 toward each other. The elastic force of the elastic member 403 increases the static frictional force between the first hinge base 401 and the second hinge base 402, thereby holding the first housing 101 inclined at an angle when a user watches video, such as DMB video, using the portable terminal.

The first hinge base 401 is mounted in the inside of a side of an end portion of the first housing 101 and the second hinge base 402 is mounted in the inside of a side of an end portion of the second housing 102. The second rotation cylinder 421 protrudes outside of the second housing 102 to be combined with the first rotation cylinder 411.

Although not shown in figures, a flexible printed circuit to connect circuit devices installed inside the first housing 101 and the second housing 102 may be provided. To provide a path for the flexible circuit, the hinge device 400 may include a wiring hole 425 that extends through the second rotation cylinder 421 along the rotation axis B.

The rotation ranges of the first hinge base 401 and the second hinge base 402 according to the current exemplary embodiment of the present invention can be restricted by the locking protrusion, the rotation groove, and the flange according to the foregoing exemplary embodiments of the present invention.

As described above, according to the exemplary embodiments of the present invention, when a pair of housings of a portable terminal are combined, their rotation axis is positioned at one side of the housings and the housings rotate in a direction that front and back faces of one of the housings are reversed, thereby allowing a user to conveniently use the portable terminal to view video. Moreover, during a communication mode, the portable terminal is configured as a bar-type terminal, and, during a broadcast viewing mode, the portable terminal is configured so that one housing is supported by a flat surface and the other housing having a display device is inclined with respect to the flat surface, thereby contributing to the diversification of the design of the portable terminal.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A hinge device for connecting a first and second housing of a portable terminal, the hinge device comprising:
   a first hinge base disposed on an end portion of the first housing and adjacent a first side edge of the first housing;
   a second hinge base disposed on an end portion of the second housing adjacent a first side edge of the second housing, and where the second hinge base rotates with respect to the first hinge base about an axis extending parallel to said first side edges of said first and second housings, through said respective end portions and perpendicular to said end portions, whereby said first and second housings pivot with respect to each other about said first side edges; and
   an elastic member that provides an elastic force urging the first and second hinge bases toward each other,
   wherein said first hinge base and second hinge base are pivotable between a first position where said first and second housings are parallel to each other and lie in the same plane and a second position where the first housing is inclined with respect to a flat surface when the second housing is placed on the flat surface in a position where the first and second housings are at an angle with respect to each other such that the first and second housings are rotated with respect to each other about said axis with said first side edge of said first housing and second housing placed on said surface.

2. The hinge device of claim 1, further comprising:
   a first rotation cylinder that extends from the first hinge base; and
   a second rotation cylinder that extends from the second hinge base,
   wherein the second rotation cylinder penetrates the first rotation cylinder and rotates within the first rotation cylinder.

3. The hinge device of claim 2, further comprising a rotation groove disposed in the second hinge base to surround the second rotation cylinder, wherein the first rotation cylinder slides in the rotation groove.

4. The hinge device of claim 3, further comprising:
   a flange on an inner wall of the rotation groove; and
   a locking protrusion protruding from the first rotation cylinder,
   wherein the locking protrusion interferes with the flange to restrict the rotation range of the second hinge base.

5. The hinge device of claim 2, wherein an end of the second rotation cylinder extends through the first rotation cylinder.

6. The hinge device of claim 5, further comprising:
   an engaging groove on the protruding end of the second rotation cylinder; and
   an E-ring engaged in the engaging groove.

7. The hinge device of claim 6, wherein a first end of the elastic member is supported by the E-ring and a second end of the elastic member is supported by the first hinge base.

8. The hinge device of claim 7, further comprising a washer between the E-ring and the elastic member and a washer between the second hinge base and the elastic member.

9. The hinge device of claim 7, wherein the elastic member comprises one of a helical compression spring and a wave washer.

10. The hinge device of claim 1, further comprising:
    a first magnetic substance provided on an opposite side of the end portion of the first housing from where the first hinge base is mounted; and
    a second magnetic substance provided in a corresponding location of the second housing, wherein an attractive force is generated between the first magnetic substance and the second magnetic substance when the first magnetic substance and the second magnetic substance face each other.

11. The hinge device of claim 1, wherein said first side edge of said first housing is perpendicular to said respective end portion and said first side edge of said second housing is perpendicular to said respective end portion and where said axis extends along said first side edges of said first and second housings.

12. The hinge device of claim 1, wherein said hinge axis is oriented to enable said first and second housings to lie on the flat surface in the first position, and said first housing is inclined with respect to said second housing with said first side edge of said first housing contacting the flat surface when pivoted to a second position.

13. A hinge device for connecting a first housing and a second housing of a portable terminal, the hinge device comprising:
    a first hinge base disposed on an end portion adjacent a side edge of the first housing;
    a second hinge base disposed on an end portion adjacent a side edge of the second housing and rotating in opposition to the first hinge base about a hinge axis extending through said respective end portions, said second hinge base having a ball bearing through-hole; and
    a third hinge base disposed on the second hinge base, the third hinge base including a ball bearing and an elastic member biasing the ball bearing through the through-hole in the second hinge base and into engagement with the first hinge base,
    wherein said first and second hinge housings are pivotable between a first position where said first and second hinge housings are parallel to each other and lie in the same plane, and a second position where said first and second hinge housings lie in planes that are inclined with respect to each other, and where the first housing is inclined with respect to a flat surface when the second housing is placed on the flat surface when the first and second housings are in said second position.

14. The hinge device of claim 13, further comprising:
    a first rotation cylinder that extends from the first hinge base; and
    a second rotation cylinder that extends from the second hinge base, wherein the second rotation cylinder penetrates the first rotation cylinder and rotates within the first rotation cylinder.

15. The hinge device of claim 14, further comprising:
a rotation groove disposed in the first rotation cylinder; and
a locking protrusion protruding from the second rotation cylinder,
wherein the rotation groove and the locking protrusion slide in contact with each other.

16. The hinge device of claim 15, further comprising a flange on the rotation groove, wherein the locking protrusion interferes with the flange to restrict the rotation range of the second hinge base.

17. The hinge device of claim 14, further comprising:
engaging holes in the first hinge housing formed adjacent to the ball bearing hole in the second hinge housing.

18. The hinge device of claim 17, further comprising the ball bearing supporting one end of the elastic member.

19. The hinge device of claim 18, wherein the third hinge base comprises:
an elastic member cylinder with an open end and a closed end, the elastic member cylinder receiving the elastic member; and
cylinder engaging grooves formed at both sides of the elastic member cylinder.

20. The hinge device of claim 19, wherein the cylinder engaging grooves and the engaging holes engage each other to fix the third hinge base to the second hinge base.

21. The hinge device of claim 20, further comprising locking recesses formed adjacently to the through-hole of the first rotation cylinder, wherein a portion of the ball bearing engages the locking recesses when the ball bearing hole faces a locking recess.

22. The hinge device of claim 19, wherein a first end of the elastic member is supported by the ball bearing and a second end of the elastic member is supported by the elastic member cylinder.

23. The hinge device of claim 13, wherein an end of the second rotation cylinder protrudes through the first rotation cylinder.

24. The hinge device of claim 23, further comprising:
a cylinder engaging groove formed on the protruding end of the second rotation cylinder; and
an E-ring engaged in the engaging groove.

25. The hinge device of claim 13, wherein the first hinge base and the second hinge base are rotatable with respect to each other about an axis extending along and parallel to a side edge of said first and second housings and perpendicular to a plane of said end portions, whereby said first and second housing pivot with respect to each other about said first side edges.

26. The hinge device of claim 13, wherein said hinge axis is oriented to enable said first and second housings to lie on the flat surface in a first position, and said first housing is inclined with respect to said second housing with said first side edge of said first housing contacting the flat surface when pivoted to a second position.

* * * * *